(12) United States Patent
Grimes

(10) Patent No.: US 9,056,541 B2
(45) Date of Patent: Jun. 16, 2015

(54) BOW PIVOT ASSEMBLY FOR A SIDE ROLL TARPING SYSTEM

(71) Applicant: Aero Industries, Inc., Indianapolis, IN (US)

(72) Inventor: Michael J. Grimes, Atwater, OH (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 14/278,012

(22) Filed: May 15, 2014

(65) Prior Publication Data

US 2014/0339850 A1    Nov. 20, 2014

Related U.S. Application Data

(60) Provisional application No. 61/824,495, filed on May 17, 2013.

(51) Int. Cl.
  *B60J 11/00* (2006.01)
  *B60J 7/08* (2006.01)
  *B60P 7/04* (2006.01)

(52) U.S. Cl.
  CPC ... *B60J 7/085* (2013.01); *B60P 7/04* (2013.01)

(58) Field of Classification Search
  CPC ........ B60J 7/1204; B60J 7/1234; B60J 7/062; B60J 7/1265; B60J 7/085; B60J 7/102; A01K 97/01; A47C 7/66; A61F 2/2445
  USPC .................... 296/98, 100.12, 100.13, 100.17, 296/100.18, 105, 121, 122, 107.09, 118, 296/104, 100.11; 135/133
  See application file for complete search history.

(56) References Cited

U.S. PATENT DOCUMENTS

| | | | | |
|---|---|---|---|---|
| 4,042,275 A | * | 8/1977 | Glassmeyer et al. | 296/43 |
| 4,248,475 A | * | 2/1981 | Johnsen | 296/100.17 |
| 5,002,328 A | * | 3/1991 | Michel | 296/98 |
| 5,050,923 A | * | 9/1991 | Petelka | 296/98 |
| 5,054,841 A | * | 10/1991 | Zalman | 296/165 |
| 5,186,231 A | * | 2/1993 | Lewis | 160/310 |
| 5,211,441 A | * | 5/1993 | Barkus et al. | 296/104 |
| 5,253,914 A | * | 10/1993 | Biancale | 296/100.13 |
| 5,288,123 A | * | 2/1994 | Dimmer | 296/100.17 |
| 5,429,408 A | * | 7/1995 | Henning et al. | 296/100.12 |
| 5,487,584 A | * | 1/1996 | Jespersen | 296/100.18 |
| 5,664,824 A | * | 9/1997 | Stephens et al. | 296/100.17 |
| 5,873,210 A | * | 2/1999 | Brumleve | 296/100.17 |

(Continued)

*Primary Examiner* — Kiran B Patel
(74) *Attorney, Agent, or Firm* — Maginot, Moore & Beck, LLP

(57) ABSTRACT

A bow system is provided for an open-topped container body having a cover sized and configured to extend laterally across the body from one side rail to the other side rail. The bow system includes a plurality of curved bows pivotably mounted at one end to one side rail and sized to extend in a curved path over the open-top of the container body to engage the other side rail at an opposite end of the bows. A ridge pole assembly is provided that includes first and second ridge pole segments, each of the segments pivotably engaged to a corresponding number of the plurality of curved bows. A tether element is coupled between the facing ends of the ridge pole segments that permits movement of the segments relative to each other as the bow system is moved between a deployed configuration in which the plurality of curved bows extend across the open-top of the container body and a retracted position in which the curved bows are substantially outside the open-top of the container body.

7 Claims, 3 Drawing Sheets

(56) References Cited

U.S. PATENT DOCUMENTS

| | | | |
|---|---|---|---|
| RE36,748 E * | 6/2000 | Stephens et al. | 296/100.17 |
| 6,142,554 A * | 11/2000 | Carroll et al. | 296/100.12 |
| 6,361,100 B1 * | 3/2002 | Koester | 296/100.18 |
| 6,513,856 B1 * | 2/2003 | Swanson et al. | 296/98 |
| 6,981,734 B2 * | 1/2006 | Martin | 296/100.12 |
| 7,484,789 B1 * | 2/2009 | Aulick | 296/100.11 |
| 8,579,353 B1 * | 11/2013 | Aulick | 296/100.12 |
| 2003/0090124 A1 * | 5/2003 | Nolan et al. | 296/98 |
| 2005/0088007 A1 * | 4/2005 | Royer | 296/100.17 |
| 2009/0039670 A1 * | 2/2009 | Conny et al. | 296/100.18 |
| 2013/0112232 A1 * | 5/2013 | Clark | 135/121 |
| 2013/0249236 A1 * | 9/2013 | Smith et al. | 296/98 |
| 2013/0300147 A1 * | 11/2013 | Schmeichel et al. | 296/98 |
| 2014/0210228 A1 * | 7/2014 | Cramaro | 296/100.11 |

* cited by examiner

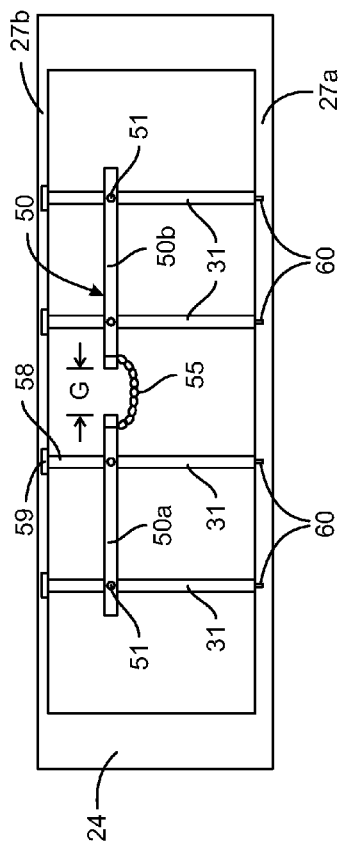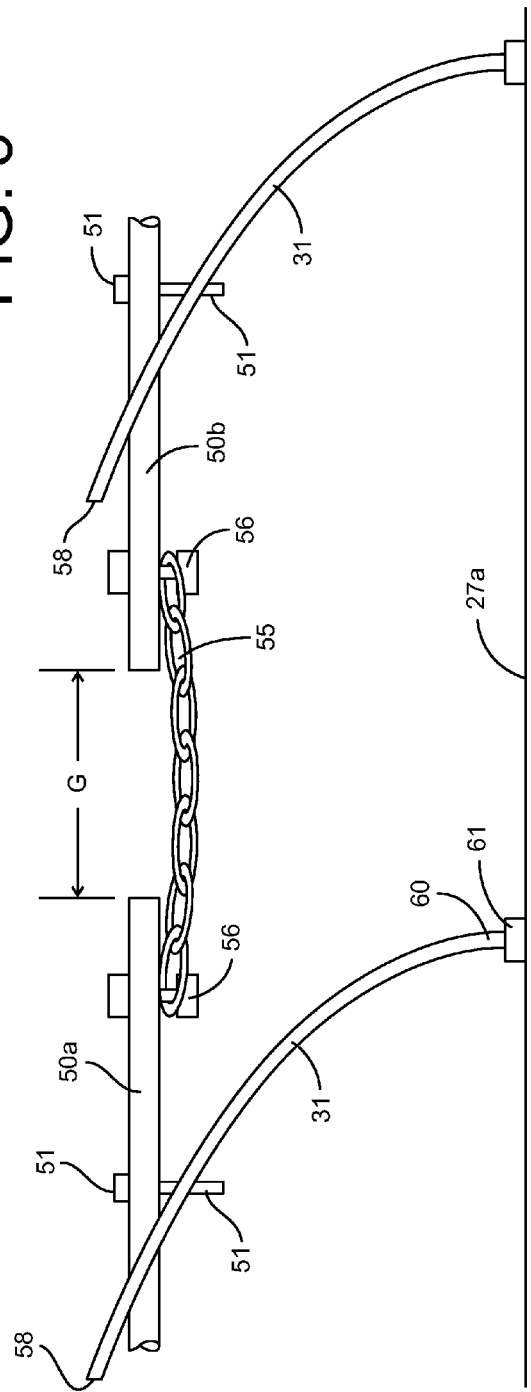

BOW PIVOT ASSEMBLY FOR A SIDE ROLL TARPING SYSTEM

REFERENCE TO RELATED APPLICATION AND PRIORITY CLAIM

This application is a non-provisional of and claims priority to provisional application No. 61/824,495, filed on May 17, 2013, the entire disclosure of which is incorporated herein.

BACKGROUND

The present disclosure relates to cover or tarping systems for trailers, containers and trucks, and in particular to side roll tarping systems in which the cover is rolled or unrolled from one side of the trailer/container body to the other.

As shown in FIG. 1, a cover system 20 is mounted to a trailer, dump body or truck box 24. The top 25 of the body 24 is open for top-loading of materials, such as grain, refuse and the like, into the interior of the body. The cover system 20 is configured to cover the open top of the body to protect and contain the materials during transport. The cover system includes a roll-up tarp 28 that is rolled onto a bar 29 that is part of a deployment system 30. The deployment system 30 shown in FIG. 1 is a manual crank system, but it is understood that other types of manual and powered deployment systems may be used to roll or unroll the tarp to thereby extend or retract the cover relative to the top 25 of the body 24.

In some applications the cover or tarp may extend flat across the top of the body. However, in many applications, such as for hauling heaped loads, it is desirable for the cover to have a curvature or form an arc over the body. The cover system 20 thus includes a number of curved bows 31 that are mounted to a side rail 27a on one side of the body 24 by a pivot mount 34. The bows can thus pivot from a position extending across the top 24, as shown in FIG. 1, to a retracted position adjacent side rail 27a, as shown in FIG. 3. In the deployed position, the free ends of the bows can be held in position by an engaging element 36 at the opposite side rail 27a, which may be in the form of a collar configured to receive a post extending from the end of the bow. Other forms of engagement between the free ends of the bows 31 and the side rail 27b are contemplated.

When the cover 28 is retracted, the bows 31 can also be retracted to provide unfettered access through the top 25 of the body 24. Thus, the cover system 20 is provided with a ridge pole 40 that extends along the length of the body and is pivotally connected to each bow at a pivot connection 41, as shown in FIGS. 1-3. In the prior systems, the ridge pole 40 is generally located along the centerline of the dump body 24 and serves to hold the bows for movement in unison. A deployment cable 44 is provided that is used to pull the ridge pole 40, and thus all of the bows 31, from the deployed position of FIGS. 1-2 to the retracted position of FIG. 3.

The cover system 20 shown in FIGS. 1-3 is a known system, such as is disclosed in U.S. Pat. No. 5,487,584. One detriment of this system is that the bows 31, and the associated pivot mounts 34 and engaging elements 36, interfere with the open top 25 of the trailer or body 24. There is a need for a cover system that is suitable for heaped loads but avoids the problems of the prior devices.

SUMMARY

To address this problem, the present invention contemplates modifications to the ridge pole. In particular, a bow system is provided for an open-topped container body having side rails on opposite sides of the body and a cover sized and configured to extend laterally across the body from one side rail to the other side rail. The bow system includes a plurality of curved bows pivotably mounted at one end to one of the side rails. The bow are sized to extend in a curved path over the open-top of the container body to engage the other side rail at an opposite end of the bows so that the curved bows provide a surface for supporting the cover over the open-top of the container body.

In one aspect of the present disclosure, the bow system includes a ridge pole assembly including independent first and second ridge pole segments. Each of said segments is pivotably engaged to a corresponding number of the plurality of curved bows. Each ridge pole segment includes an end facing the other segment and the ridge pole assembly includes a tether element coupled between the facing ends that permits movement of the ridge pole segments relative to each other as the bow system is moved between a deployed configuration in which the plurality of curved bows extend across the open-top of the container body and a retracted position in which the curved bows are substantially outside the open-top of the container body. In a further aspect, the ridge pole assembly is coupled o the bows laterally offset from the longitudinal centerline of the container body

DESCRIPTION OF THE FIGURES

FIG. 4 is a top view of a cover system and ridge pole assembly according to one aspect of the present disclosure with the cover system in its deployed position.

FIG. 5 is a detail side view of a portion of the cover system shown in FIG. 4, with the system in its retracted position.

DETAILED DESCRIPTION

Figure 1:
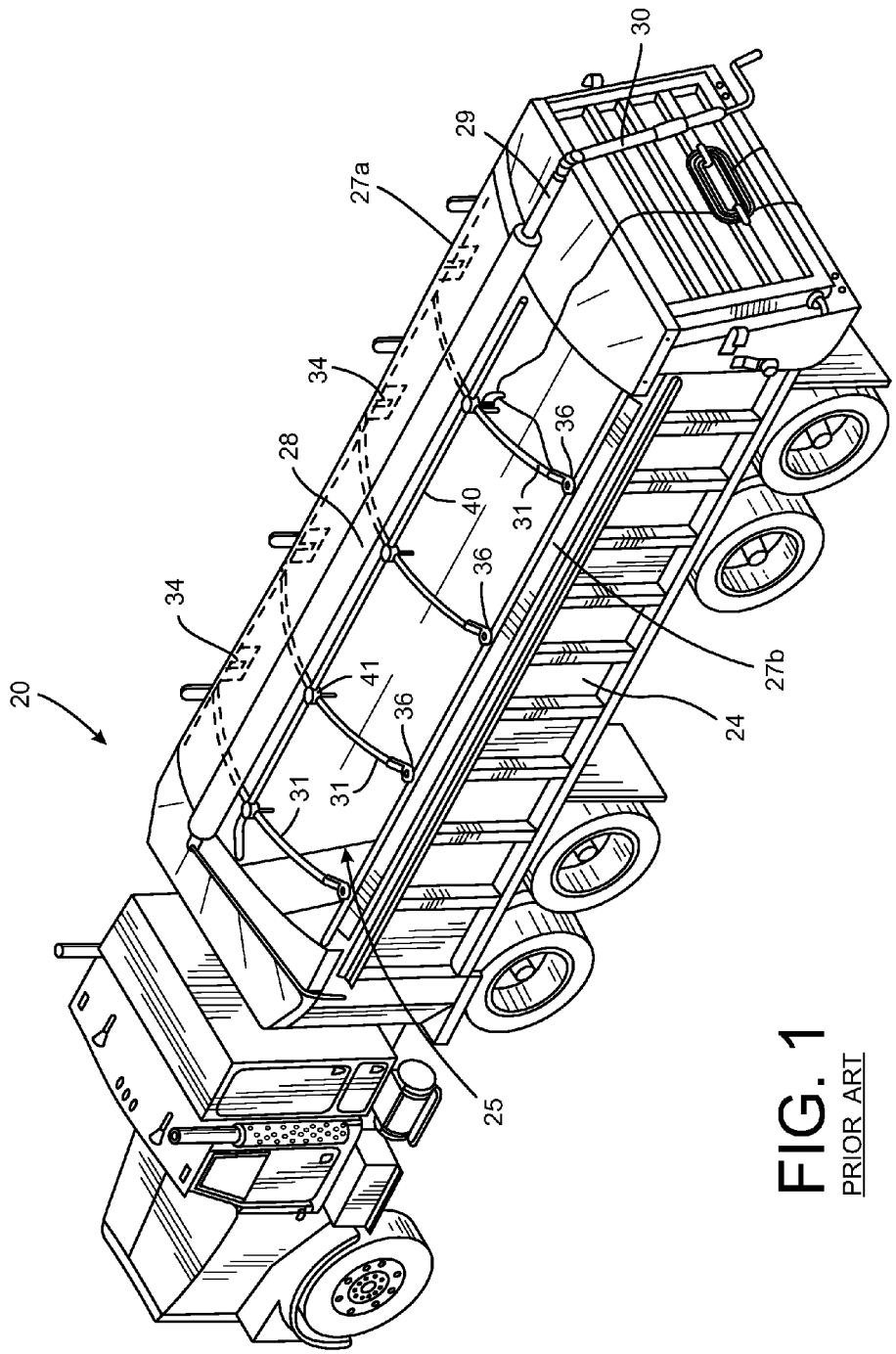
FIG. 1 is a perspective view of a truck and trailer having a cover system for heaped loads mounted on the trailer.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure encompasses any alterations and modifications to the illustrated embodiments and includes further applications of the principles of the disclosure as would normally occur to one skilled in the art to which this disclosure pertains.

In particular, as shown in FIGS. 4-5, a ridge pole assembly 50 includes two ridge pole segments 50a, 50b. Each segment is connected to a corresponding number of bows 31 by a pivot connection 51. The pivot connection can be similar to the pivot connection 41 known in the art, or may take other forms provided it permits full relative pivoting between the ridge pole segment and the curved bows. For instance, the pivot connection 51 may include a collar fastened around the ridge pole segment that is fastened to the bow 31 by a fastener, such as a spring-biased screw that permits relative rotation or pivoting, in the manner shown in FIG. 6 of the '584 patent discussed above, and incorporated herein by reference (with specific reference to col. 4, lns. 9-29). The two ridge pole segments 50a, 50b are connected to the bows offset from the center line of the container body 24, as shown in FIG. 4. The ridge pole assembly is preferably connected to the bows at a position between about ¼ and ⅓ of the length of the bows 31. Although not shown in FIGS. 4-5, one of the ridge pole segments can be engaged to a deployment system, such as the deployment cable 44 shown in FIG. 2. As with the deployment cable shown in FIG. 2, the deployment cable engaged to one of the ridge pole segments 50a, 50b is used to deploy the bow system to and from a retracted and a deployed configuration.

The free end 58 may be provided with a mounting pad for contact or engagement with the side rails 27b or a clamp 59 situated on the side rail 27b. For example, the free end 58 may include a foot plate that either engages the top of the side rail 27b or engages a locking plate, as disclosed in the '584 patent described above. The opposite end of the bows is pivotably mounted to the side rail 27a by a pivot post 60 projecting from either the side rail or from the end of the bow 31, as depicted in FIG. 5. In the latter configuration, the side rail 27a may include a socket 61 for receiving the post 60 in pivoting engagement. Alternatively, if the pivot post is part of the side rail, the socket may be incorporated into the end of the bow 31. It can be appreciated that the manner of engagement of the bows 31 to the respective side rails 27a, 27b can be accomplished as known in the art. As discussed above, the ridge pole is arranged toward the free end 58 of the bows rather than toward the pivoting end 60.

In one feature, the two pole segments are connected by a tether element 55. In one embodiment the tether element 55 is a flexible element, and more particularly is a chain that is sized to maintain a gap G between the ends of the segments 50a, 50b, at least when the system is deployed, as shown in FIG. 4 or retracted, as shown in FIG. 5. The tether element 55 is fastened to the pole segments at a location 56 that is offset from the ends of the pole segments. In one embodiment, the ends of the chain 55 may be fastened to the ridge pole segments 50a, 50b in a conventional manner, such as by a conventional fastener, like a nut and bolt combination, passing through the pole segments and engaging the end links of the chain 55. In one embodiment, the gap G may be 2-6 (two to six) inches.

Figure 2:
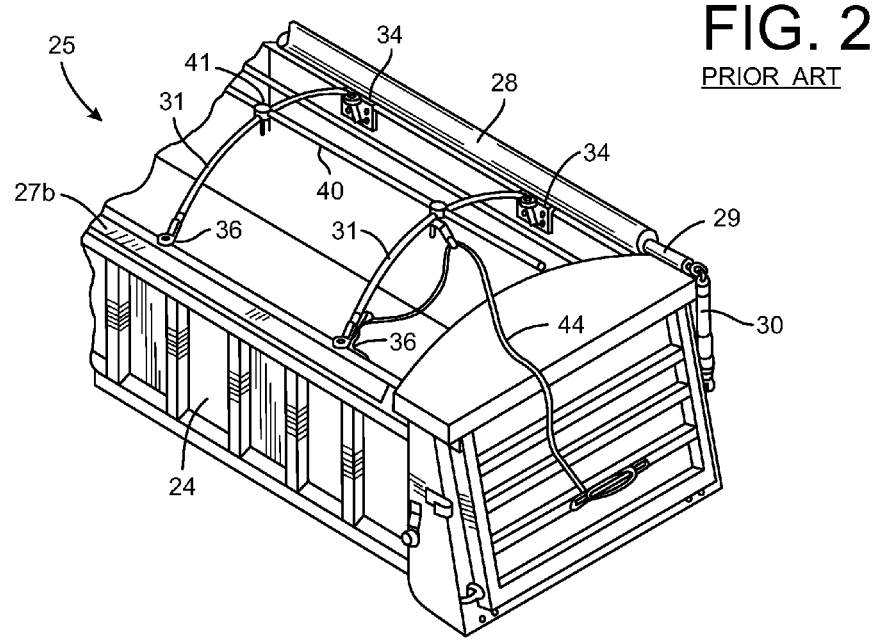
FIG. 2 is a detail perspective view of a portion of a body with a pivoting bow cover system having a centered ridge pole in the extended position.
Figure 3:
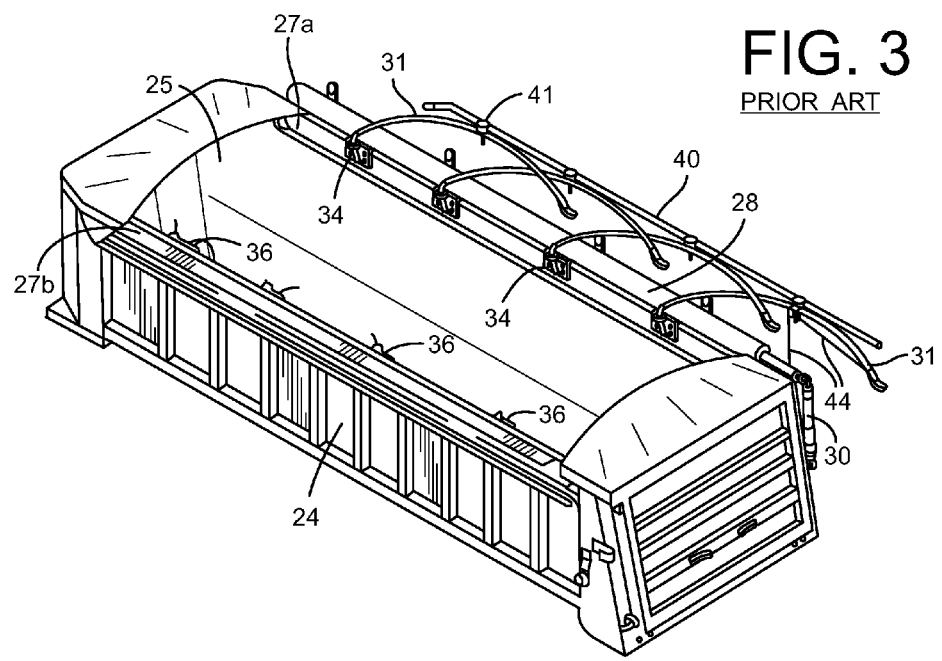
FIG. 3 is a perspective view of a body with the pivoting bow cover system in a retracted position.

The length of the tether element 55 combined with the offset attachment point allows the pole segments to move together and apart as the bows 31 and ridge pole assembly 50 is moved to and from the deployed and retracted positions shown in FIGS. 4-5. In addition, the tether element provides a flexible connection at the mid-point of the ridge pole assembly that allows the pole segments to move side-to-side relative to each other during pivoting of the bows. Thus, as the cover assembly 20 is deployed, the bows 31 do not move in lock-step under the influence of the ridge pole assembly 50. In other words, when the deployment system, such as the deployment cable 44 shown in FIG. 2, is used to pull the bows between the extended and retracted positions, the two segments 50a, 50b move in multiple directions relative to each other. As the deployment cable 44 pulls one ridge pole segment, such as segment 50a, the tether element 55 pulls the other segment, 50b, along with the first segment, 50a. In doing so, the tether element 55 continuously shifts between a taut condition and a slack condition as the inertia of the moving components produce variations in pivoting of each of the bows 31 relative to the side rail 27a and of the corresponding ridge pole segment relative to the bows about the pivot connections 51. This free relative movement allows the ridge pole and bows to be moved outside the envelope of the opening 25 of the trailer body 24 which prevents the bows and ridge pole assembly from interfering with material being introduced into or dispensed from the trailer body 24 through the open top 25 (FIG. 1).

In the illustrated embodiment, the tether member 55 is disclosed as a chain because of its durability and strength. However, other flexible tether elements are contemplated, such as a cable, provided that the element can accommodate relative movement of the ends of the ridge pole segments 50a, 50b toward and apart from each other. To that end, the tether member 55 may incorporate an elongated plate having slotted openings at its ends that receive the fasteners 56 to engage the ends of the ridge pole segments. While the elongated plate itself may not be flexible, the interface between the plate and ridge pole segments is flexible in that it can accommodate different distances between the ends of the ridge pole segments as the assembly is moved between deployed and retracted positions. The elongated plate will also transmit pulling forces when the fasteners are at the ends of the slotted openings so that moving one pole segment by the deployment cable 44 will cause both ridge pole segments and associated bows to move.

The present disclosure should be considered as illustrative and not restrictive in character. It is understood that only certain embodiments have been presented and that all changes, modifications and further applications that come within the spirit of the disclosure are desired to be protected.

For instance, in the illustrated embodiment the ridge pole is provided in two segments 50a, 50b. In other embodiments the ridge pole may be divided into more than two segments with a tether element 55 between each segment. In addition, the disclosed embodiment shows a cover assembly on a trailer vehicle but it should be appreciated that the same assembly and ridge pole assembly 50 may be used on a stationary container or other open-topped container utilizing a bow structure similar to structure disclosed herein.

What is claimed is:

1. A bow system for an open-topped container body, the body having side rails on opposite sides of the body and a cover sized and configured to extend laterally across the body from one side rail to the other side rail, the bow system comprising:

a plurality of curved bows pivotably mounted at one end to one of said side rails and sized to extend in a curved path over the open-top of the container body to engage the other side rail at an opposite end, the curved bows providing a surface for supporting the cover over the open-top of the container body; and a ridge pole assembly including first and second ridge pole segments, each of said segments pivotably engaged to a corresponding number of said plurality of curved bows, wherein each ridge pole segment includes an end facing the other ridge pole segment and the ridge pole assembly includes a tether element coupled between the facing ends that permits movement of the ridge pole segments relative to each other as the bow system is moved between a deployed configuration in which the plurality of curved bows extend across the open-top of the container body and a retracted position in which the curved bows are substantially outside the open-top of the container body.

2. The bow system of claim 1, wherein said tether element is a flexible element.

3. The bow system of claim 2, wherein the tether element is a chain.

4. The bow system of claim 1, wherein each of the curved bows includes a pivot post and socket between said one end of the bows and said one of said side rails.

5. The bow system of claim 1, wherein the container body defines a longitudinal centerline between said side rails and the ridge pole assembly is pivotably connected to said plurality of bows so that the ridge pole segments are laterally offset from said longitudinal centerline toward a side rail when the bow system is in is deployed configuration.

6. The bow system of claim 5, wherein the ridge pole segments are laterally offset toward said one of said side rails at which the bows are pivotably mounted.

7. The bow system of claim 1, wherein the ridge pole assembly includes more than two ridge pole segments with a corresponding tether element coupled between facing ends of adjacent pole segments.

\* \* \* \* \*